Aug. 11, 1959    B. M. HARRISON ET AL    2,898,762
DRIP FREE DISTILLATION RECEIVER
Filed June 24, 1957
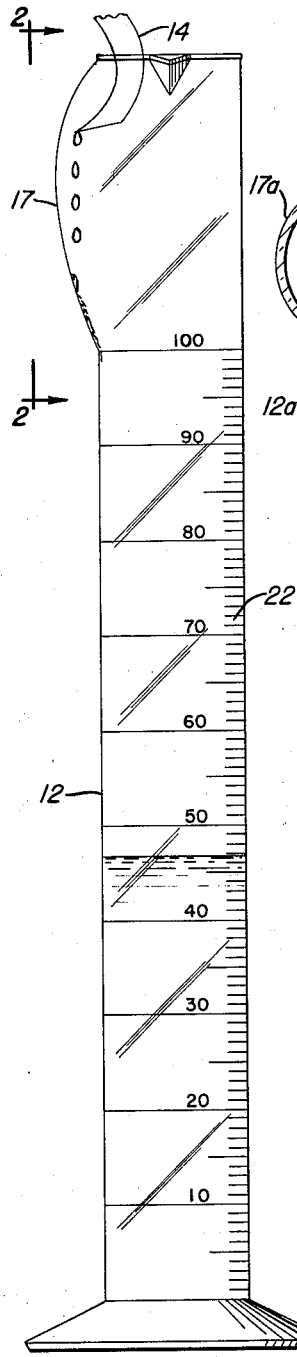
Fig. 1
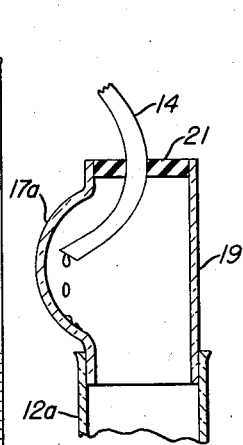
Fig. 5
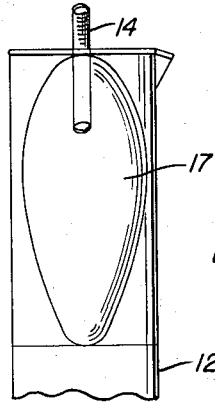
Fig. 2
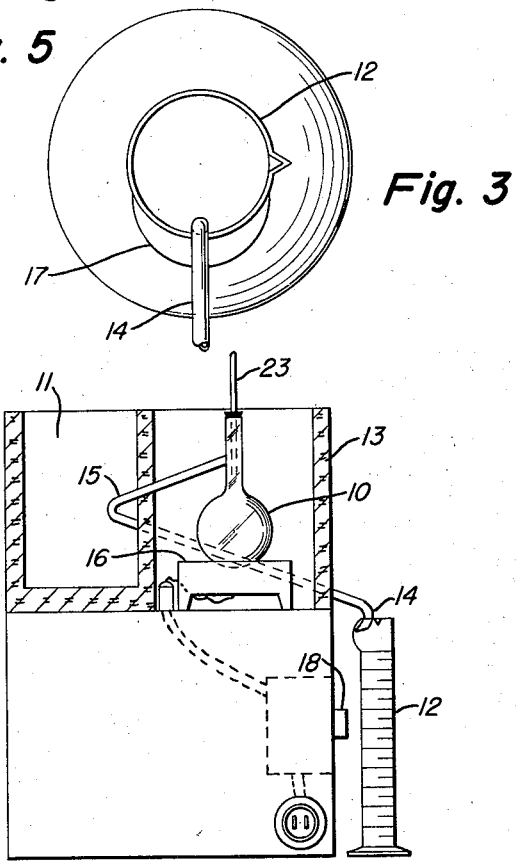
Fig. 3
Fig. 4
INVENTORS:
Benjamin M. Harrison
Ellis E. Mulkey
BY
ATTORNEY United States Patent Office 2,898,762
Patented Aug. 11, 1959

2,898,762
DRIP FREE DISTILLATION RECEIVER

Benjamin M. Harrison and Ellis E. Mulkey, Dickinson, Tex., assignors to The American Oil Company, Texas City, Tex., a corporation of Texas Application June 24, 1957, Serial No. 667,509

8 Claims. (Cl. 73—426)

This invention relates to an apparatus useful in testing petroleum products and more particularly relates to a graduate-receiver to be used in conjunction with distillation operations adapted for use in inspection laboratories.

One of the many control tests used by industry to maintain a uniform product is a distillation test in which a small quantity of the liquid to be tested is distilled, the distillation temperature and the volume of recovered distillate being noted and recorded at regular time intervals. A standard test method and apparatus has been set up, approved and adopted by the American Petroleum Institute and the American Society for Testing Materials. This test method is referred to as ASTM Method D86–54.

The apparatus employed in such ASTM distillation includes a distillation flask, a heater for the distillation flask, condenser means for the distillate, and a graduate receiver for collecting the condensate. It is with respect to the graduate-receiver that our invention pertains.

The condenser tube extending from the ASTM distillation apparatus is normally curved at its discharge and so that it may be placed against the inside wall of the receiver thereby enabling the distillate to run down the side of the receiver. In this manner, the level of the distillate being collected is not disturbed. Heretofore, in order to observe or detect the initial drop of distillate in determining the ASTM initial boiling point, it has been necessary to move the conventional graduate to one side and then later move the receiver against the condenser outlet to prevent dripping which disturbs the meniscus.

One of the requirements of an ASTM distillation is that it be distilled at a certain rate. The rate can be observed by using a stop watch while reading the increase in volume in the receiver. However, the operator can determine by observing the rate of the drops coming overhead through the condenser outlet whether or not the rate is according to the method. On the other hand, it is important that the operator also be able to read the quantity of the distillate in the graduate at the same time that he is determining the rate of distillation.

Conventional graduates are not well suited for such dual observations inasmuch as if the discharge tube is in contact with the graduate wall, the drops cannot be counted; if the tube is permitted to discharge into the graduate in such a manner as to permit the drops to fall through the graduate, then the upper level of the liquid in the graduate is disturbed and it is not possible to make an accurate reading.

It is, therefore, a primary object of our invention to provide an improved graduate-receiver which is adapted to determine the ASTM initial boiling point, to ascertain the distillation rate, and to measure the total collected distillate, all without the necessity for repositioning the graduate-receiver. A further object of the invention is to provide an improved ASTM graduate-receiver which is adapted for routine use with a minimum of manipulation of the receiver. An additional object is to provide a graduate-receiver particularly adapted for use on automatic distillation equipment. These and other objects of our invention will become apparent as the description thereof proceeds.

Briefly, according to our invention, we provide a distillation receiver which includes a blister, bay, or side-wall chamber near the top of the graduate-receiver having a lower wall onto which the distillate from the condenser outlet impinges after falling an appreciable distance downward thereby enabling the detection of the initial drop and the determination of the distillation rate. The condensate flows from the blister chamber down the sidewall of the receiver to be collected within the graduate-receiver where the level is measured continuously or from time-to-time.

Further details and advantages of our invention will be described by reference to the accompanying drawings wherein:

Figure 1 is an elevation of a graduate-receiver designed in accordance with our invention;

Figure 2 is a fragmentary view taken along the line 2—2 in Figure 1;

Figure 3 is a top view of the apparatus of Figure 1;

Figure 4 is a schematic elevation of an ASTM assembly employing the graduate-receiver of our invention; and Figure 5 illustrates an adapter for graduates to convert them to a receiver according to our invention.

Referring to the drawing, a predetermined quantity of the sample is placed in the distillation flask 10. The condenser box 11 containing cooling water is maintained at a desired temperature by cooling coils (not shown). The graduate-receiver 12 is arranged in front of the cabinet 13 below the outlet end 14 of the condensate tube 15. One such receiver 12 is used in conjunction with each flask 10 and condensate is discharged from the condenser tube 15 associated with the flask 10 into the condensate receiver 12. When the first drop falls from the outlet end 14 of the condenser tube 15 into the receiver 12, the reading of the flask thermometer 23 is recorded as the initial boiling point. This first drop falls from the end 14 of the condenser tube 15 onto the sloping wall of the blister 17.

Heat is applied to the flask 10 by heater 16 and is so regulated by the control 18 that the distillation proceeds at a uniform rate. The reading of the distillation thermometer 23 is taken when 10 cc. of distillate has been collected in the graduate-receiver 12. The heating is continued until the temperature level as indicated by the thermometer 23 reaches a maximum and begins to drop. The drop will ordinarily be observed after the bottom of the flask 10 has become dry and the highest temperature observed is recorded as the end point temperature. The volume of the distillate collected in the receiver 12 is read from scale 22 and is recorded as the recovery.

Referring to Figures 1–3, the blister 17 can be provided in a number of ways. It may be an integral portion of the upper end of the graduate-receiver 12 as shown in Figures 1–4. However, it is contemplated that an adapter comprising a generally cylindrical sleeve 19 having a blister 17a on one wall thereof can be provided for attaching to the upper end of a conventional receiver 12a. A rubber seal or diaphragm 21 may be placed between the condenser outlet 14 and the upper open end of the receiver 12 or adapter 19. One such embodiment is illustrated by Figure 5 and the seal 21 may also be applied to the apparatus of Figures 1–4.

The advantages of our ASTM distillation graduate-receiver include:

(1) Drops from the condenser outlet 14 are at all times in view thereby enabling initial boiling point observations as well as the determination of the rate of the distillate coming overhead.

(2) While observing the distilled drops coming overhead, the meniscus in the graduate 12 is not disturbed, thereby permitting easy and accurate reading of the volume of distillate at anytime.

(3) When distilling light products it is very important that a vapor seal be made at the top of the graduate-receiver to minimize the vaporization loss of like constituents from the receiver 12 during the distillation. If the graduate-receiver must be moved during the distillation to observe the rate of distillate drops this vapor seal 21 would be disturbed. By employing our graduate-receiver 12 it is not necessary that it be moved during the distillation for any reason and accordingly a vapor seal 19 is not disturbed.

(4) In routine testing laboratory practice, it is frequently necessary for an operator to run four to six ASTM distillation units at one time. By our invention the operator is enabled to observe the rate of distillation while reading the accumulated distillate level within the graduate, without the need of physically moving each of the four to six graduates 12 two or three times in making the readings of distillation rate or distillate collected. By the use of our invention none of the receivers need be touched after initial positioning until the determination has been completed.

From the above it will be apparent that we have attained the objects of our invention, and although the apparatus has been described with reference to preferred embodiments thereof, it should be understood that these are by way of illustration only and that our invention is not necessarily limited thereto. Furthermore, in view of the description given, modifications in the design and of the mode of operation will be apparent to those skilled in the art. Accordingly, it is contemplated that such modifications can be made without departing from the spirit of the invention.

What we claim is:

1. An improved laboratory receiver which includes a tubular body, a pouring lip at the upper end of said body, and a bay in the wall portion of said tubular body adjacent the upper end thereof, said bay being circumferentially remote from said pouring lip and providing a recessed spillway onto which fluids to be measured first impinge in flowing into the receiver.

2. A distillation receiver comprising a tubular body open at one end and closed at the other, a graduate scale on said receiver, a pouring lip at said open end, and a blister adjacent the open end of said receiver, said blister being of generally tear-drop shape and being disposed remote from said pouring lip and above the upper end of said graduate scale on the wall portion of the receiver.

3. An improved graduate-receiver for use in connection with a distillation flask and condenser assembly having a discharge conduit for condensate comprising a tubular body, a base for said body, a pouring lip at the upper end of said body, and a blister enlargement in the wall of said tubular body adjacent the upper end thereof and displaced from said pouring lip.

4. An improved graduate-receiver adaptable for use in collecting condensate liquid from an ASTM installation and for observing the liquid dropping from a condenser discharge tube without disturbing the meniscus of the collected liquid in said graduate-receiver, a minor part of the improvement which comprises a symmetrically elongated enlargement of the wall portion adjacent the upper end of said receiver forming an isolated side chamber having a lower inclined wall portion merging at its lower end with the wall of the receiver and onto which the liquid impinges before flowing down the wall of the receiver.

5. In a graduate-receiver for use in conjunction with an ASTM laboratory distillation test apparatus, the improvement which comprises an elongated tubular receiver, a volume scale on said receiver, a pouring lip at the top of said receiver, and a blister enlargement adjacent the upper end of said receiver, said blister being disposed peripherally with respect to said lip and adapted to receive the flow from the discharge line of such distillation apparatus whereby the initial drop of condensate may be observed and the subsequent drop rate may be counted without disturbing the surface of condensate collected in said receiver.

6. An apparatus for conducting laboratory distillations comprising in combination a distillation flask, a heater for the distillation flask, a condenser, a discharge line extending from said distillation flask and through said condenser, a graduate-receiver, a pouring lip at the upper end of said receiver, a down-turned terminal on said discharge line directed into the graduate-receiver, and said graduate-receiver having a side chamber adjacent the upper end thereof and separate from said lip, said terminal extending into said chamber, whereby condensate from said terminal first impinges on a downwardly and inwardly sloped wall portion of said chamber and then flows downwardly along the receiver wall.

7. Distillation testing apparatus comprising in combination a distillation flask adapted to contain a liquid to be distilled, a graduate-receptacle, thermometer means associated with said flask, a condenser casing for a cooling medium, a condenser tube supported in inclined position within the condenser casing and submerged in said medium, the upper end of the condenser tube being connected to said flask and the lower end of said condenser tube projecting outwardly of said condenser casing and terminating above said graduate-receptacle, an angular terminal duct on said condenser tube directed generally downward into said receptacle, and a radial enlargement in a minor wall portion of said receptacle adjacent the upper end thereof, said terminal duct being disposed radially outward of the wall portion of said receptacle and discharging into said enlargement.

8. An improved laboratory graduate for use in dropwise collection of condensate liquid from a duct and for determining dropping rate without moving the graduate and without disturbing the surface of the collected liquid comprising an adapter for a graduate-receiver which includes a generally cylindrical sleeve adapted to be inserted into the upper end of such graduate-receiver, a symmetrical blister in a minor portion of the total wall surface of said sleeve, and a sealing diaphragm across the upper end of said adapter, said diaphragm being adapted to receive said duct which discharges into said blister.

References Cited in the file of this patent

UNITED STATES PATENTS

| | | |
|---|---|---|
| 320,784 | Hicks | June 23, 1885 |
| 920,773 | Mitchell et al. | May 4, 1909 |
| 1,435,367 | Ablahadian | Nov. 14, 1922 |

UNITED STATES PATENT OFFICE
CERTIFICATE OF CORRECTION

Patent No. 2,898,762                                              August 11, 1959

Benjamin M. Harrison et al.

It is hereby certified that error appears in the printed specification of the above numbered patent requiring correction and that the said Letters Patent should read as corrected below.

Column 3, lines 64 and 65, strike out "a minor part of"; column 4, line 1, after "enlargement of" insert -- a minor part of --.

Signed and sealed this 17th day of May 1960.

(SEAL)

Attest:

KARL H. AXLINE

Attesting Officer

ROBERT C. WATSON

Commissioner of Patents